United States Patent [19]

Elrod

[11] Patent Number: 4,748,461

[45] Date of Patent: May 31, 1988

[54] CAPILLARY WAVE CONTROLLERS FOR NOZZLELESS DROPLET EJECTORS

[75] Inventor: Scott A. Elrod, Menlo Park, Calif.

[73] Assignee: Xerox Corporation, Stamford, Conn.

[21] Appl. No.: 65,137

[22] Filed: Jun. 25, 1987

Related U.S. Application Data

[63] Continuation of Ser. No. 921,893, Oct. 22, 1986, abandoned, which is a continuation of Ser. No. 820,045, Jan. 21, 1986, abandoned.

[51] Int. Cl.[4] .............................................. G01D 15/16

[52] U.S. Cl. .................................. 346/140 R; 310/334

[58] Field of Search .......................... 346/140, 75, 1.1; 310/334

[56] References Cited

U.S. PATENT DOCUMENTS

| | | | |
|---|---|---|---|
| 3,211,088 | 10/1965 | Naiman | 101/114 |
| 4,308,547 | 12/1981 | Lovelady et al. | 346/140 R |
| 4,383,265 | 5/1983 | Kohashi | 346/140 R |
| 4,697,195 | 9/1987 | Quate | 346/140 R |

FOREIGN PATENT DOCUMENTS 941213 1/1981 U.S.S.R. .

*Primary Examiner*—Joseph W. Hartary

[57] ABSTRACT

A nozzleless droplet ejector for ejecting droplets from a free surface of a pool of liquid, such as a pool of ink, comprises a selectively energizeable emission controller for generating a freely propagating capillary wave on the surface of the pool to provide on/off timing control and/or ejection trajectory angle control for the ejector. The controller comprises a conductor and a counter electrode. The conductor is immersed in the pool, whereby a capillary surface wave is generated when a voltage is applied across the conductor and the counter electrode. In one embodiment, a focused ultrasonic acoustic wave or the like perturbs the pressure acting on the free surface of the pool, and the capillary wave supplied by the controller coherently interacts with that pressure perturbence to provide the desired control.

Separate controllers may be provided for independently controlling the ejectors of multiple ejector arrays. The functionality of these emission controllers is dependent on the geometry of their conductors, so a few exemplary geometries are disclosed with the understanding that there are others which may be used.

18 Claims, 1 Drawing Sheet

CAPILLARY WAVE CONTROLLERS FOR NOZZLELESS DROPLET EJECTORS

This application is a continuation, of application Ser. No. 921,893, filed Oct. 22, 1986, now abandoned, which is a continuation of Ser. No. 820,045, filed Jan. 21, 1986, now abandoned.

FIELD OF THE INVENTION

This invention relates to nozzleless droplet ejectors and, more particularly, to emission controllers (e. g., on/off switches and directional controllers) for such ejectors. Droplet ejectors having emission controllers embodying this invention are useful for liquid ink printing and similar applications.

BACKGROUND OF THE INVENTION

Ink jet printing has the inherent advantage of being a plain paper compatible, direct marking technology. "Continuous stream" and "drop on demand" ink jet print heads have been developed to exploit that advantage. Unfortunately, however, the nozzles which are used in conventional ink jet print heads are expensive to manufacture and are a significant source of maintenance problems.

Others have proposed nozzleless droplet ejectors for liquid ink printing. For example, Lovelady et al. U.S. Pat. No. 4,308,547, which issued Dec. 24, 1981 on a "Liquid Drop Emitter," describes a print head in which a piezoelectric transducer having a hemispherically shaped focusing lens is submerged in a reservoir of ink to generate a spherically focused ultrasonic acoustic wave for exciting the ink near the surface of the reservoir sufficiently to eject individual droplets of ink. Furthermore, a copending and commonly assigned United States patent application of C. F. Quate et al. Ser. No. 776,291 which was filed Sept. 16, 1985, now abandoned, and refiled on Jan. 5, 1987 as continuation Ser. No. 946,682 on a "Nozzleless Droplet Ejector," describes an improved droplet ejection mechanism in which one or more relatively low cost, planar piezoelectric transducers having interdigitated electrodes are provided for generating the focused ultrasonic acoustic waves which are employed in nozzleless print heads of the foregoing type.

As a general rule, liquid ink printing requires substantial control over the timing of the drop ejection process. The transducers of nozzleless print heads of the above-described type may be driven by amplitude modulated rf signals to provide the necessary timing control, but the electronics needed to modulate a rf signal are expensive. Thus, as pointed out in the aforementioned Quate et al. application, the preferred approach is to provide timing controllers which operate independently of the transducers. Under those circumstances, the transducer or transducers may be driven by a relatively inexpensive rf signal generator to excite the ink to a subthreshold, incipient energy level for droplet emission, thereby enabling the timing control or controllers to selectively destabilize the excited ink so that individual droplets are ejected on command.

Some liquid ink printing processes, such as matrix printing, are easier and less costly to implement if there also is provision for directionally steering the ink droplets. In recognition of that, some of the transducers disclosed in the above-identified Quate et al. application are configured to generate focused acoustic waves having a directionally controlled asymmetry.

SUMMARY OF THE INVENTION

In accordance with the present invention, a nozzleless droplet ejector for ejecting droplets from a free surface of a pool of liquid, such as a pool of ink, comprises a selectively energizeable emission control for generating a freely propagating capillary wave on the surface of the pool to provide on/off timing control and/or ejection trajectory angle control for the ejector. The controller comprises a conductor and a counter electrode which are immersed in the reservoir, whereby a capillary surface wave is generated when a voltage pulse is applied across the conductor and the counter electrode. In one embodiment, a focused ultrasonic acoustic wave or the like locally perturbs the pressure acting on the free surface of the pool, and the capillary wave supplied by the controller coherently interacts with this pressure pertubence to provide the desired control.

Separate controllers may be provided for independently controlling the ejectors of multiple ejector arrays. The functionality of these emission controllers is dependent on the geometry of their conductors, so a few exemplary geometries are disclosed with the understanding that there are others which may be used.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
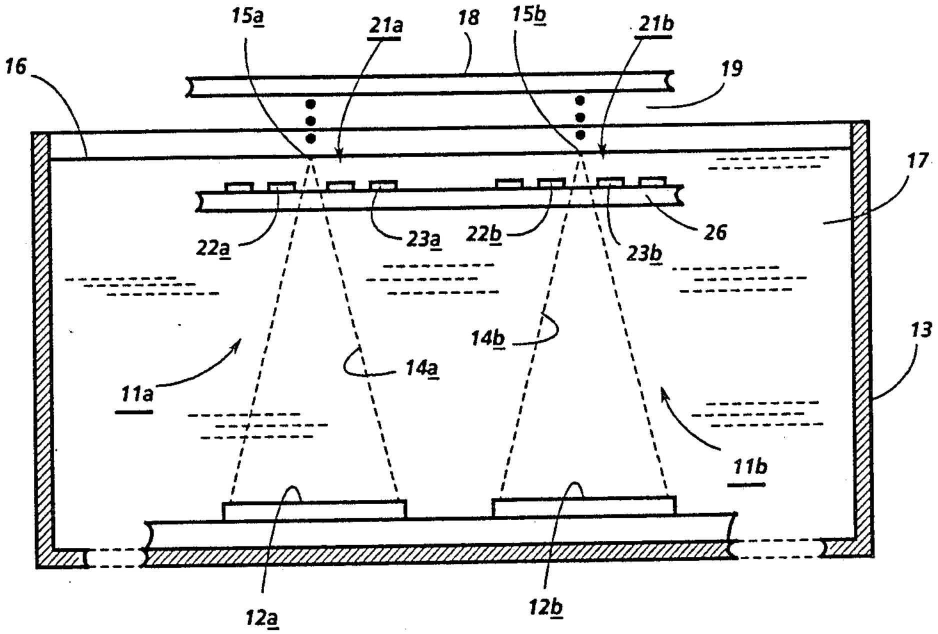
FIG. 1 is a partially sectioned and fragmentary, schematic elevational view of a nozzleless liquid droplet ejector array having emission controllers constructed in accordance with the present invention.

Turning now to the drawings, and at this point especially to FIG. 1, there is an array of liquid droplet ejectors **11*a* and 11*b* comprising a plurality of acoustic transducers 12*a* and 12*b* which are submerged in a liquid filled reservoir 13. The transducers 12*a* and 12*b* are laterally displaced from each other and are driven by an rf power supply (not shown) to launch ultrasonic acoustic waves 14*a* and 14*b* into the reservoir 13, so that the acoustic waves come to focus on laterally offset centers 15*a* and 15*b*, respectively, at or near the surface 16 (i.e., the liquid/air interface) of the reservoir 13. Known means may be employed for supplying focused acoustic waves to locally perturb the pressure acting on the free surface 16 of the reservoir or pool 13**, so the transducers 12a and 12b are illustrated schematically. Indeed, there are mechanical, electrical, thermal, pnuematic and other alternatives to the transducers 12a and 12b which may be employed to produce localized perturbances, on the free surface 16 of the reservoir 13. Furthermore, while only two ejectors 11a and 11b are shown, it will be understood that the number of transducers may be increased to form larger arrays. The ejector packing density is limited primarily by the transducer center-to-transducer center spacing that is required to prevent objectionable levels of "crosstalk" between adjacent ejectors, such as between the ejectors 11a and 11b.

In a printer, of course, the reservoir 13 is filled with liquid ink 17. Moreover, a suitable recording medium 18, such as plain paper, is located above the reservoir 13, with just a narrow air gap 19 separating it from the ink/air interface or surface 16. Typically, the ejectors 11a and 11b are assembled in a linear array, so the recording medium 18 is advanced in an orthogonal cross-line direction (into or out of the plane of FIG. 1) relative to the ejectors 11a and 11b while a two dimensional image is being printed As will be appreciated, the individual picture elements or "pixels" of such an image are determined by (1) the time dependent on/off switching of the individual ejectors, such as the ejectors 11a and 11b, and (2) in some cases, by the time dependent steering of the individual droplets of ink.

In accordance with the present invention, relatively inexpensive and easily fabricated capillary wave control devices 21a and 21b are provided for controlling the on/off timing of the ejectors 11a and 11b, respectively, and/or for steering the droplets of ink emitted thereby. The control devices 21a and 21b comprise electrical conductors 22a and 22b and counter electrodes 23a and 23b, respectively, which are immersed in the liquid 17. The conductors 22a and 22b are located near (for example, within about 1 cm of) the focal centers 15a and 15b of the acoustic waves 14a and 14b, respectively. The counter electrodes 23a and 23b should be nearby and preferably are concentric with the electrodes 22a and 22b, respectively. Typically, the counter electrodes 23a and 23b are returned to a suitable reference potential (hereinafter, "ground potential"). Furthermore, a switched power supply 25 (FIG. 2), which is also referenced to the ground potential, has electrically independent outputs coupled to the conductors 22a and 22b for applying appropriately and independently timed voltage pulses thereto. Alternatively, the controllers 21a and 22b could be driven by an ac power supply having appropriate control circuitry.

Electric field gradients assocaited with the applied potential between the conductors 22a and 22b and the counterelectrodes 23a and 23b exert a dielectric body force on the liquid 17. This results in a disturbance at the liquid surface 16 which subsequently propagates as a free capillary wave on the surface 16. Generation of capillary waves is accomplished with moderately high voltage (e. g., 300 volts or so) pulses of brief duration (e. g., on the order of 500 $\mu$secs) being across the conductors 22a and 22b and the counterelectrodes 23a and 23b. The voltage and time limits, if any, of this wave generation process have not been determined, so it is noted in the interest of completeness that the foregoing examples are based on data from experiments conducted in water. However, the experimental data indicates that the emission control is most effective if the conductors 22a and 22b are located just below the free surface 16 of the liquid 17. For example, as shown, the conductors 22a and 22b may be supported on an electrical insulator 26, such as mylar sheet, so that they are covered by a thin film of liquid 17. A sufficiently thin sheet 26 will allow essentially unimpeded passage of the acoustic waves 14a and 14b.

As will be understood, the capillary waves propagate radially with respect to the conductors 22a and 22b at the capillary surface wave velocity, $\nu$, in the liquid 17, and they are damped as a function of time because of the viscosity of the liquid 17. Their wavelength, $\lambda$, is dependent on the dominant Fourier transform component(s) of the voltage pulses applied to the conductors and is given to a first approximation by $\lambda \approx \nu \Delta t$, where $\Delta t$ equals the width of the pulses applied to the conductors 22a and 22b. The damping of the capillary waves is an important consideration for determining the maximum permissible radial displacement of the conductors 22a and 22b from the acoustic wave focal centers 15a and 15b, respectively. The radial propagation of the capillary waves and the pulse width dependency of their wavelengths, on the other hand, are relevant to optimizing the configuration of the conductors 22a and 22b and to selecting the phase and the width of the pulses applied thereto for the specific emission control tasks which the control devices 21a and 21b are intended to perform.

Figure 2:
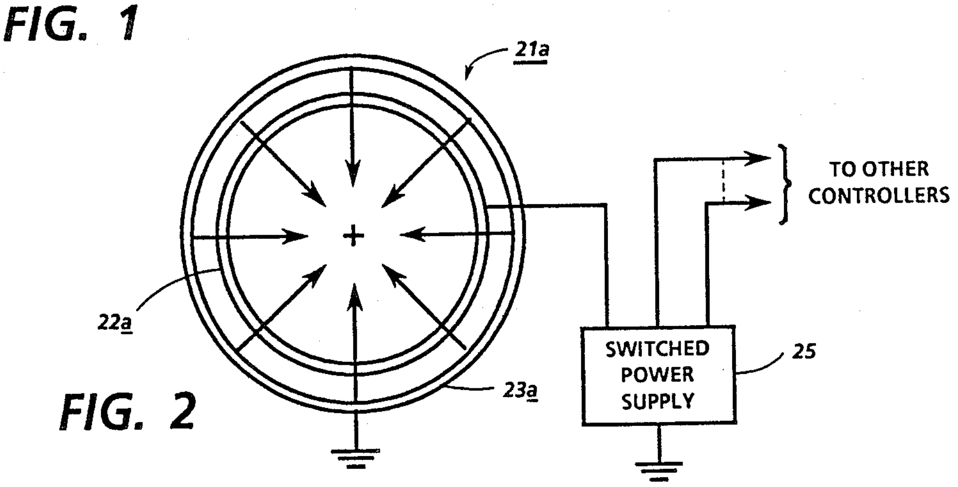
FIG. 2 is an enlarged simplified plan view of one the capillary wave control switches shown in FIG. 1.

More particularly, as best shown in FIG. 2, the conductor 22a and its associated counterelectrode 23a have constant radius, ring-like configurations and are generally circularly symmetric with respect to the focused pressure wave 14a (i.e., concentric with its focal center 15a). Thus, a capillary wave launched by them converges, as indicated by the arrows, to a symmetrical focus at approximately the focal center 15a of the pressure wave 14a, thereby enabling the controller 21a to provide axial on/off switching control for the ejector 11a (FIG. 1). The relative phase relationship of the focused capillary and acoustic waves determines whether they interact constructively (additively) or destructively (subtractively). For example, the controller 21a may be employed to "turn on" the ejector 11a if the amplitude of the acoustic wave 14a is selected to excite the liquid 17 upon which it is focused (i.e., the liquid within the waist of the pressure wave 14a) to be near but below the threshold of incipient droplet formation. In this case, the ejector 11a would be operated in a "normally off" mode. While the circular symmetry of the conductor 22a is well suited to the switching function of the controller 21a, other symmetrical geometries could be employed, including equilateral polgon-shaped conductors. The symmetrical focus of the capillary wave is the key to providing axial on/off control for the ejector 11a.

Figure 3:
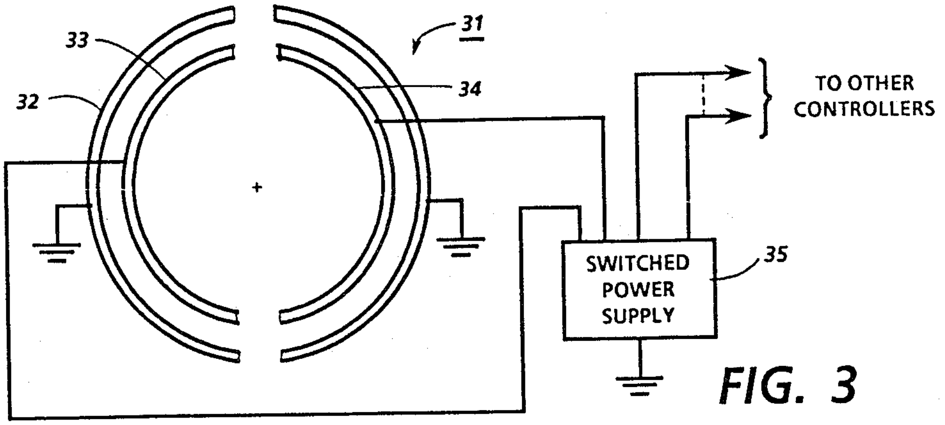
FIG. 3 is an enlarged simplified plan view of a capillary controller which is similar to the switch shown in FIG. 2, except that it has a segmented conductor to provide angular trajectory control in addition to on/off control.

Referring to FIG. 3, there is another controller 31 which is constructed in accordance with this invention to provide on/off switching and angular trajectory control for a nozzleless droplet ejector, such as the representative ejector 11a (FIG. 1). As will be seen, the controller 31 is similar to the controller 21a (FIG. 2), except that its ring-like conductor 32 comprises a plurality of electrically independent segments 33 and 34 which are selectively addressable by a switched power supply 35. When the power supply simultaneously applies equal amplitude voltage pulses to all of the conductor segments 33 and 34, the capillary waves launched by them converge to a generally symmetrical focus at or near the focal center 15a of the pressure wave 14a (FIG. 1), thereby causing the controller 31 to perform essentially the same axial on/off switching function as the controller 21a. When, however, the conductor segments 33 and 34 are differentially driven, such as if voltage pulses are applied to one of them but not the other, the capillary wave or waves come to an asymmetrical focus, thereby altering the angular trajectory of any droplets which are then being emitted by the ejector 11a. The phase of the asymmetrically focused capillary wave may be selected to switch the ejector 11a on, or the on/off control for the ejector 11a may provided by means not shown. Dividing the conductor 32 into two diametrically opposed, independently addressable segments 33 and 34, such as shown, allows the angular trajectory of the ejected droplets to be controlled along an axis parallel to the center line of the segments 33 and 34 over a range on the order of ±30°(at a droplet diameter of about 100 μm) with respect to longitudinal axis of the ejector or, in other words, with respect to an axis normal to the plane of the recording medium 18. Smaller diameter droplets are capable of being steering over even wider angles. If multiaxial trajectory control is desired, the conductor 32 may be divided into a larger number of individually addressable segments. Furthermore, it will be understood that the conductor 32 may be composed of individually addressable, polygonally arranged segments, without materially altering its performance.

CONCLUSION

In view of the foregoin, it will now be understood that the present invention provides relatively reliable and inexpensive ejection controllers for nozzleless droplet ejectors of various types. These controllers may be design optimized to perform a variety of different control functions. For example, they can be employed not only as on/off switches and/or angular trajectory controller as described herein, but also as droplet ejection velocity controllers. Thus, while the controllers may be used to substantial advantage in nozzleless liquid ink printers of the above-described type, it will be understood that the broader aspects of the invention are not limited to printing.

What is claimed:

1. In combination with a nozzleless droplet ejector having a pool of liquid with a free surface, and means for launching an acoustic wave into said pool such that said acoustic wave comes to a focus approximately at said free surface to exert a radiation pressure thereagainst, the improvement comprising a capillary wave emission controller for said ejector; said controller including a conductor and a counter electrode, said conductor being shallowly immersed in said pool and being proximate to the focus of said acoustic wave, and means coupled across said conductor and said counter electrode for applying voltage pulses thereacross on command to cause freely propagating capillary surface waves to radiate from said conductor, whereby said capillary waves interact with said radiation pressure to control at least one emission characteristic of said ejector.

2. The improvement of claim 1 wherein said acoustic waves excites the liquid upon which it is focused to an energy level which is offset from a threshold energy level for destabilizing said liquid, and said capillary wave causes the energy level of said excited liquid to cross over said threshold level, whereby said emission controller provides on/off control for said ejector.

3. The improvement of claim 2 wherein said conductor is symmetrical with respect to the focus of said acoustic wave and is electrically continuous, whereby said emission controller provides axial on/off timing control for said ejector.

4. The improvement of claim 3 wherein said conductor is symmetrical with respect to the focus of said acoustic wave.

5. The improvement of claim 1 wherein said conductor is asymmetrical with respect to the focus of said acoustic wave, whereby said controller provides angular ejection trajectory control for said ejector.

6. The improvement of claim 5 wherein said acoustic wave excites the liquid upon which it is focused to an energy level below a threshold energy level for destabilizing said liquid, and said capillary wave causes the energy level of said excited liquid to exceed said threshold level, whereby said emission controller also provides on/off timing control for said ejector.

7. The improvement of claim 6 wherein said conductor has a plurality of electrically independent segments, and said means for applying said voltage pulses include means for selectively addressing said segments, whereby said voltage pulses are selectively applied to said segments to control the angular ejection trajectory of said ejector.

8. The improvement of claim 7 wherein said acoustic waves excites the liquid upon which it is focused to an energy level below a liquid destabilizing threshold energy level, and said capillary wave causes the energy level of said excited liquid to exceed said threshold level, whereby said emission controller also provides on/off timing control for said ejector.

9. The improvement of claim 8 wherein said conductor is symmetrical with respect to the focus of said acoust wave, whereby an axial ejection trajectory is provided when said pulses are simultaneously applied to all of said segments.

10. The improvement of claim 9 wherein said conductor is circularly symmetrical with respect to the focus of said acoustic wave.

11. In a printer having a nozzleless droplet ejector, said ejector including a pool of liquid ink having a free surface defined by an ink/air interface, and means for launching an acoustic pressure wave into said pool such that said acoustic wave comes to focus approximately at said free surface, an improved emission controller for said ejector comprising a conductor means and a counter electrode, said conductor means being shallowly immersed in said pool and being proximate to the focus of said acoustic wave, and means coupled across said conductor and said counter electrode for applying voltage pulses thereacross on command to radially launch freely propagating capillary surface waves from said conductor means, whereby said capillary waves interact with said acoustic wave to control at least one emission characteristic of said ejector.

12. An emission controller for a nozzleless droplet ejector having means for applying a localized pressure perturbence to a free surface of a pool of liquid, said controller comprising means for generating a capillary wave on said surface on command to operationally affect said ejector.

13. The emission of controller of claim 12 wherein said capillary wave provides on/off timing control for said ejector.

14. The emission controller of claim 12 wherein said capillary wave provides droplet ejection angle control for said ejector.

15. The emission controller of claim 14 wherein said capillary wave also provides on/off timing control for said ejector.

16. The emission controller of claim 12 wherein said pressure perturbence is focused approximately on the surface of said pool, said controller is located to generate said capillary wave in close proximity to said focused pressure perturbence, and said capillary wave coherently interacts with said pressure perturbence.

17. The emission controller of claim 16 wherein said emission controller is symmetrical with respect to said focused pressure perturbence for providing axial on/off timing control for said ejector.

18. The emission controller of claim 17 wherein said emission controller is differentially exciteable for additionally providing droplet ejection angle control for said ejector.

* * * * *